United States Patent [19]

Otten

[11] Patent Number: 5,695,422
[45] Date of Patent: Dec. 9, 1997

[54] HYDROSTATIC-MECHANICAL TORQUE DIVISION TRANSMISSION

[75] Inventor: Uli Otten, Speyer, Germany

[73] Assignee: Deere & Company, Moline, Ill.

[21] Appl. No.: 587,814

[22] Filed: Jan. 5, 1996

[30] Foreign Application Priority Data

Feb. 22, 1995 [DE] Germany ............ 195 06 062.8

[51] Int. Cl.$^6$ ............ F16H 47/04; B60K 17/04; B60K 41/16
[52] U.S. Cl. ............ 475/72; 475/79; 475/80
[58] Field of Search ............ 475/72, 73, 74, 475/75, 79, 80, 82

[56] References Cited

U.S. PATENT DOCUMENTS

| 3,293,943 | 12/1966 | MacDonald | 475/79 |
|---|---|---|---|
| 3,665,788 | 5/1972 | Nyman | 475/72 |
| 3,796,111 | 3/1974 | Schauer | 475/79 |
| 3,897,697 | 8/1975 | Chambers et al. | 475/80 |
| 5,222,921 | 6/1993 | Garcia | 475/72 |

FOREIGN PATENT DOCUMENTS

| 26 33 090 | 2/1977 | Germany. |
|---|---|---|
| 35 33 193 | 5/1987 | Germany. |
| 36 24 989 | 2/1988 | Germany. |
| 39 10 410 | 10/1989 | Germany. |
| 38 25 409 | 2/1990 | Germany. |
| 40 21 686 | 1/1991 | Germany. |

*Primary Examiner*—Khoi Q. Ta

[57] ABSTRACT

A hydrostatic-mechanical infinitely variable transmission for a vehicle includes a hydrostatic unit and a mechanical unit. The mechanical unit is a planetary drum and includes a planetary summation gearing and further planetary transmission gearings. The planetary drum has an input shaft and an output shaft which are concentric to the engine output shaft. The axis of the hydrostatic unit is parallel to and lower than the axis of the planetary drum so that the rotating parts of the planetary drum are above the level of oil in the transmission sump. The sealed hydrostatic unit is immersed in the oil of the sump and cooled thereby. The output shaft of the transmission is parallel to the axis of the planetary drum. The output of the planetary drum is coupled to the transmission output shaft by a gear train. This makes it possible to adjust the spacing and the transmission ratio between the planetary drum output and the transmission output shaft as desired.

6 Claims, 3 Drawing Sheets

HYDROSTATIC-MECHANICAL TORQUE DIVISION TRANSMISSION

BACKGROUND OF THE INVENTION

The invention relates to a hydrostatic-mechanical torque division transmission with an infinitely variable speed ratio for motor vehicles, in particular for agricultural and other utility vehicles.

In order to meet the high demand for low friction horsepower in infinitely variable transmission components, hydrostatic-mechanical transmissions with torque division are drawing increasing interest. In these transmissions the torque of the vehicle engine, for example, an internal combustion engine, is initially divided between a hydrostatic branch and a mechanical branch, rotational speed and torque converted and then brought together and superimposed on each other. In the hydrostatic branch an infinitely variable conversion of the rotational speed with a corresponding torque is possible, upon which a constant rotational speed with associated torque of the mechanical branch is then superimposed. With the corresponding steps in the mechanical branch this leads to an infinitely variable control of rotational speed and torque with a transmission ratio from approximately 0.3 to infinity. Since the transmission ratio can be varied to infinity, the starting clutch in the driveline of the vehicle can be eliminated.

An infinitely variable hydro-mechanical torque division transmission for motor vehicles with the characteristics of this class is known from DE-A-35 33 193, FIG. 8. This transmission is provided with a hydrostatic unit that can be driven by the vehicle engine and a compound gearbox that can be driven by the vehicle engine and the hydrostatic unit, which is arranged on the centerline of the engine output shaft and which is followed by a planetary gearbox whose components can be coupled to each other by clutches. The axis of the hydrostatic unit is offset from the engine output shaft and arranged above the planetary drive. The known torque division transmission is intended for passenger vehicles.

Utility vehicles place other demands on the transmission than do passenger vehicles. For one a greater transmission of torque must be guaranteed here, on the other hand the engine output shaft and the differential drive shaft are most often offset by an axle spacing characteristic of the vehicle. Due to the great amount of torque transmitted care must be taken to carry away the friction horsepower developed in the transmission components. Notable vehicle and transmission manufacturers concentrate on the development of torque division transmissions for utility vehicles. For example, a drive system has been proposed in which a transmission input shaft is coupled to the engine output shaft. The transmission input shaft drives, on the one hand, a hydrostatic unit arranged at an angle above it through a first gear train and, on the other hand, drives through a second gear train a planetary gearbox, which includes a compound gearset and a step-up gearset, which is arranged underneath the transmission input shaft and is located in the oil sump of the drive system. The offset between the engine output shaft and the planetary gearbox may fundamentally be varied by changing the second gear train, but the minimum offset is fixed by the layout of the planetary gearbox. In addition for each shaft offset the planetary drive must be laid out anew. Thereby the drive system is not appropriate for just any desired shaft offset. Furthermore the planetary gearset is located in the oil sump of the drive system which leads to undesirable splashing losses. On the other hand the hydrostatic unit is located above the oil sump, so that particular attention must be paid for adequate cooling.

The development of infinitely variable hydro-mechanical transmissions requires large expenditures for design, prototype construction, development tests and mass production. To limit the investment expense, it is appropriate to develop transmissions that can be applied without fundamental change to drivelines of various different vehicles. It would therefore be of great advantage to develop hydrostatic torque division transmission whose shaft offsets and output transmission ratios (end drive ratios) can be varied over wide limits by simple means.

SUMMARY OF THE INVENTION

Accordingly, an object of this invention is to provide a torque division transmission through which the problems and disadvantages described above are overcome.

A further object of the invention is to provide such a torque division transmission which satisfies the requirements of various drive systems, for instance also those of various vehicle manufacturers.

Another object of the invention is to provide such a torque division transmission which has a high efficiency even at high rotational speeds and permit optimum cooling of the hydrostatic unit.

These and other objects are achieved by the present invention, wherein a planetary drive is arranged on the centerline of the engine output shaft, so that the input shafts and the output shafts of the planetary drive are directed axially with respect to the engine output shaft while the input shaft and the output shaft of the hydrostatic unit as well as the output shaft of the transmission are offset from the planetary drive. As a result, the planetary drive is located above the oil level in the drive system, so that its rotating parts are not submerged in the oil sump. The result is low friction horsepower, even at high rotational speeds of the planetary drive. The planetary drive consists of a compound gearset and a number of further planetary gearsets that are arranged in line one behind the other and whose components can be coupled to each other by clutches and brakes for the shift between various drive ratios.

According to the invention the at least one output shaft of the planetary drive is connected so as to drive the transmission output shaft through at least one gear train. This permits the attainment of any desired shaft offset and any desired transmission ratio between the centerline of the engine and the transmission output shaft (for example, a differential drive shaft for a vehicle rear axle) through a simple interchange of gears, so that the infinitely variable transmission can be applied with the identical planetary drive to drivelines with various shaft offsets. By the simple modification of the gear trains it is possible, for example, to make available the same drive unit for various vehicle manufacturers that have differing requirements as to shaft offset and transmission ratio, whereby a cost effective manufacture of the planetary drive at high production quantities becomes possible.

In the solution according to the invention the hydrostatic unit may be arranged basically at any desired location on a pitch circle about the planetary drive parallel thereto. Preferably it is located downward into the oil sump of the drive system. Thereby the hydrostatic unit is cooled optimally. This measure does not lead to friction losses, since the entire hydrostatic unit can be configured as a compact modular component and does not contain any external rotating parts. Only two gear trains are necessary with just two gears in each, in order to establish the coupling between the hydrostatic unit and the planetary drive. Intermediate gears may also be used.

The torque division transmission according to the invention makes possible its division into clearly defined modular groups of components and meets the requirements of various vehicle manufacturers, even if these requirements differ widely in view of established transmission concepts (for example, shaft offset or wheelbase, differential drive ratio, final drive ratio and the final speed of the vehicle), in the manufacture and installation for various vehicle manufacturers.

The gear trains arranged between the planetary drive and the output shaft may be configured as intermediate gear sets which can be accommodated as separate gearbox modules in a separate housing, and contains a forward/reverse unit, which complies with the requirements of the vehicle manufacturer, and that makes possible a reversal of the direction of rotation and/or the transmission ratio. For the shifting, disk clutches or jaw clutches may be provided.

Preferably a central shaft extends axially through the planetary drive which is driven by the vehicle engine and which is aligned with the engine axis, which can be coupled to drive an auxiliary gearbox, for example, to drive the power take-off shaft of a tractor. It is also advantageous if the end of the central shaft, located behind the planetary drive from the vehicle engine, operates a gear train that drives the hydrostatic unit. Furthermore the at least one output shaft of the planetary drive may be configured as a hollow shaft.

According to a further embodiment of the invention the output shaft of the hydrostatic unit can be coupled through a gear train with an input shaft of the planetary drive facing the vehicle engine, so that the output rotational speed and the output torque of the hydrostatic unit is delivered directly to the input shaft of the planetary drive which is configured as a hollow shaft.

An alternative embodiment of the invention provides that one input shaft and one output shaft of the hydrostatic unit extend coaxially to each other from one side of the hydrostatic unit and can be coupled through gear trains with the output shaft of the vehicle engine or an input shaft of the planetary drive. The one-sided input and output shafts of the hydrostatic unit are favorable to a modular design of the torque division transmission.

The torque division transmission according to the invention makes possible a flexible application in utility vehicles. In particular, it can be arranged very compactly so that the necessary space is available for an inter-axle differential, whose installation had so far been as a rule omitted for space reasons.

DETAILED DESCRIPTION

Figure 1:
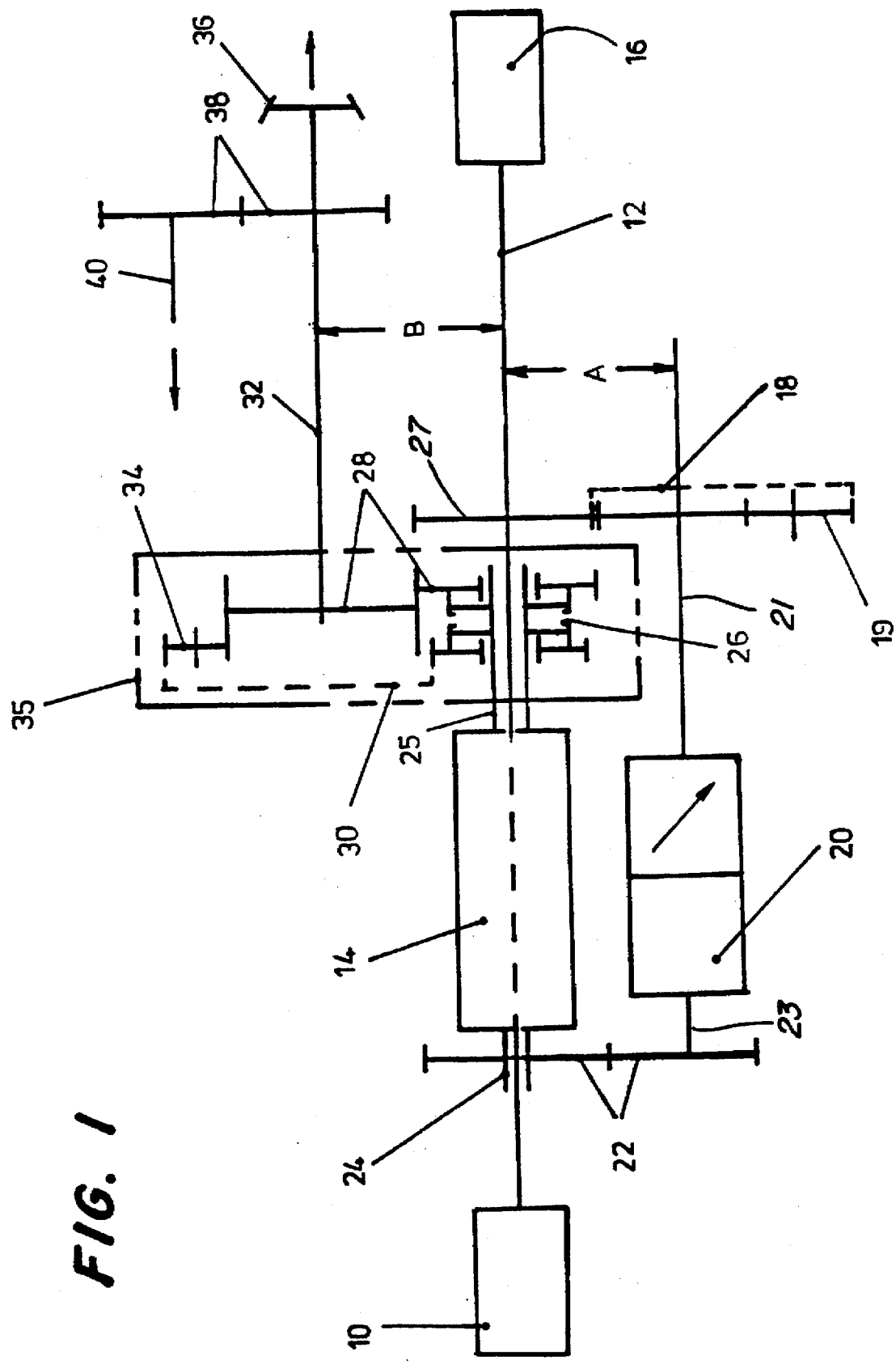
FIG. 1 is a schematic side view of a first transmission arrangement according to the invention.

FIG. 1 shows a vehicle engine 10 which is coupled directly to a central shaft 12 aligned with the engine axis. The central shaft 12 extends axially through a planetary drive 14. The free end of shaft 12 drives an auxiliary drive 16, such as a power take-off (PTO) shaft of the vehicle.

The portion of shaft 12 between the planetary drive 14 and the auxiliary drive 16 drives through a gear train 18 a hydrostatic unit 20. The gear train 18 contains an intermediate gear 19 between the gears of the central shaft 12 and the input shaft 21 of the hydrostatic unit.

In a known arrangement the hydrostatic unit 20 comprises a variable volume flow and a constant volume flow positive displacement machine. The output shaft of the hydrostatic unit 20 is connected through a further gear train 22 with the hollow input shaft 24 of the planetary drive 14. By a suitable selection of the gear trains 18 and 22, the spacing A between the central shaft 12 and the input shaft 21 and the output shaft 23 of the hydrostatic unit can be adjusted. Furthermore, by the selection of the gear trains 18, 22 the desired transmission ratios can also be adjusted.

In a known arrangement the planetary drive 14, not shown in any greater detail, contains a compound planetary gearbox as well as further planetary gear sets arranged one behind the other for the shifting between various transmission ratios of the mechanical branch. Shifting of the gearbox components is controlled by clutches and brakes. Such a planetary drive is basically known and is described, for example, in DE-A-35 33 193, DE-A-39 10 410 or DE-A-40 21 686.

The hollow output shaft 25 of the planetary drive 14 is aligned with its input shaft 24. The output torque of the output shaft 25 can be selectively transmitted through a shifter clutch 26 to one of the two gear trains 28 and 30. The one gear train 28 transmits the output rotational speed and torque of the planetary drive 14 directly to a transmission output shaft 32, which may be a differential input shaft that drives the rear axle. The other gear train 30 contains a reversing gear 34 by means of which the direction of rotation is reversed, resulting in a reverse transmission ratio. The transmission ratio and the shaft offset B between the output shaft 24 of the planetary drive 14 and the transmission output shaft 32 can be adjusted by the selection of the gears of the two gear trains 28 and 30 so as to comply with the transmission output conditions demanded. The two gear trains 28 and 30 can be combined in a separate gearbox unit with its own gearbox housing as intermediate gearbox, which has been indicated by the dashed line 35.

The transmission output shaft 32 carries a bevel gear 36 which drives an inter-axle differential and is connected through a gear train 38 with a front wheel drive shaft 40. In place of the gear train 38 for the front wheel drive, an inter-axle differential can be integrated into the transmission output shaft 32, which, however, has not been shown.

Figure 2:
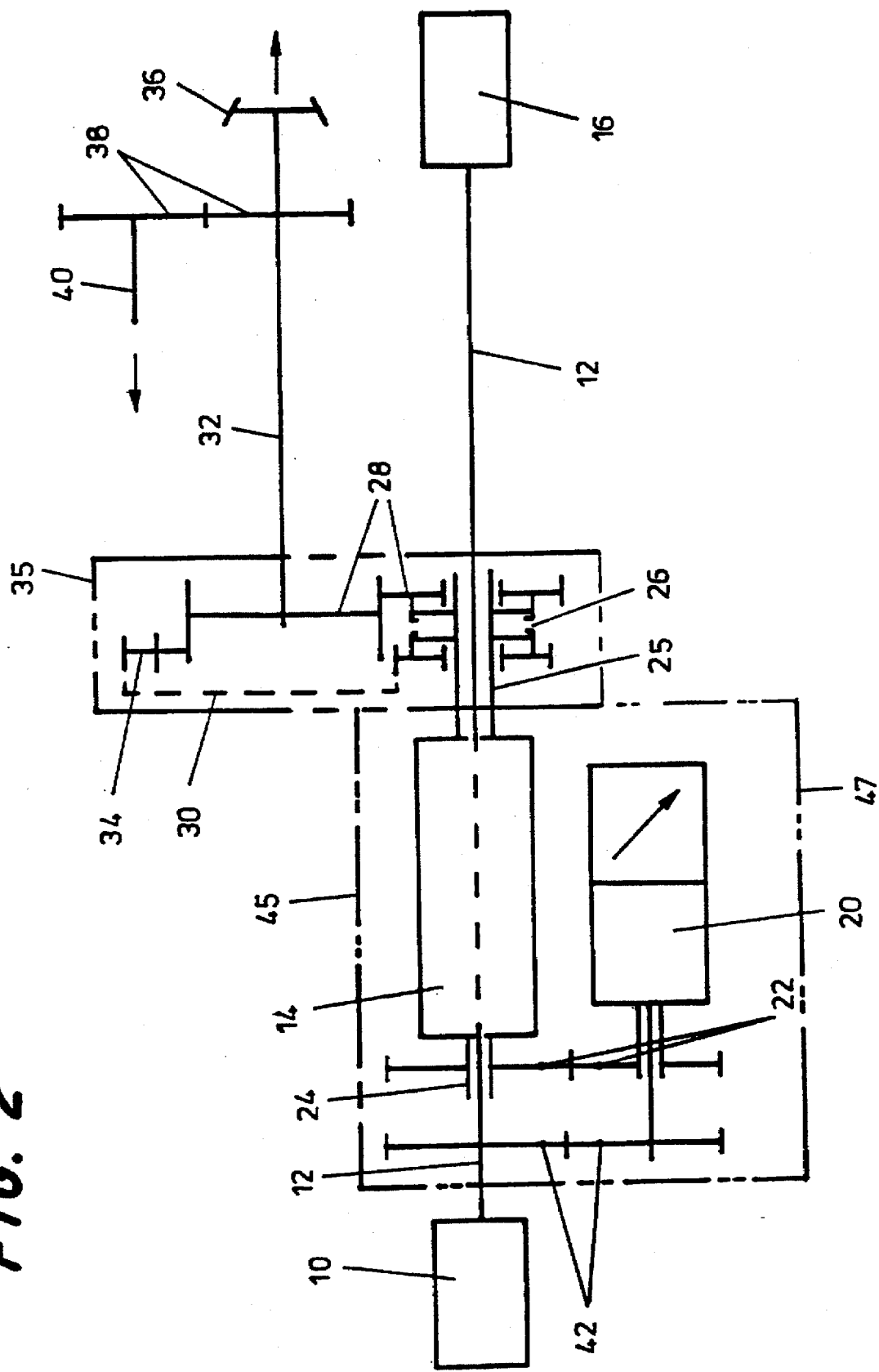
FIG. 2 is a schematic side view of a second transmission arrangement according to the invention.

The transmission arrangement of FIG. 2 differs from that shown in FIG. 1 essentially with respect to the drive of the hydrostatic unit 20. Identical components therefore carry the same reference numbers FIGS. 1 and 2. According to FIG. 2 the drive of the hydrostatic unit 20 is performed by a gear train 42, which meshes with the central shaft 12, in particular on the side of the planetary drive 14 towards the vehicle engine 10. The gear train 22 which provides the output drive of the hydrostatic unit 20 is also located on the side of the planetary drive 14 towards the engine 10. The one-sided projection of the input shaft and the output shaft of the hydrostatic unit simplifies the design of a modular configuration of the transmission arrangement, which is indicated by the dashed lines 35, 45 and 47.

Figure 3:
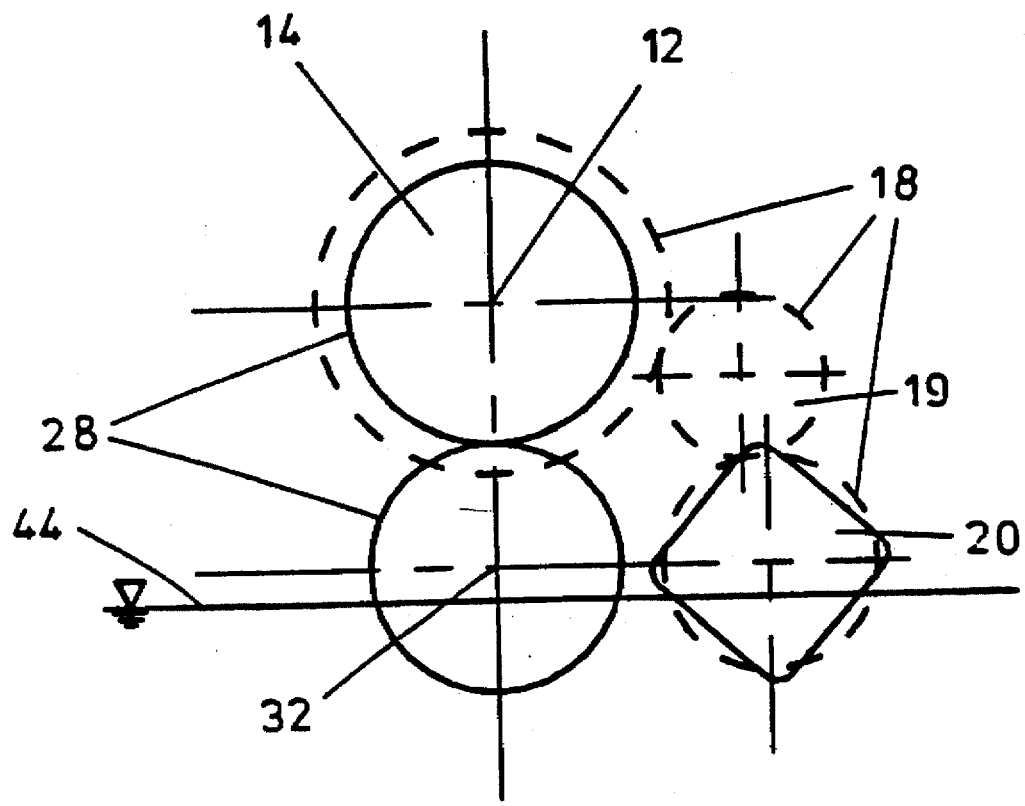
FIG. 3 is a schematic end view of the transmission of FIG. 1.

Referring now to FIG. 3, the planetary drive 14 is located concentric to the central shaft 12 which is aligned with the engine shaft and which lies vertically above the transmission output shaft 32. Shaft 32 is connected through the gear train 28 with an output gear of the planetary drive 14. The central axis of the hydrostatic unit 20 is positioned at approximately the same height as and alongside the output shaft 32. The hydrostatic unit 20 includes an input gear (not shown) which is connected through intermediate gear 19 to a gear 27 which is mounted on the central shaft 12. Line 44 represents the level of oil in the transmission housing (not shown).

As can be seen in FIG. 3 the planetary drive 14 lies above the oil level, so that its rotating parts are not hindered by having to pass through oil. On the other hand, the hydrostatic unit 20 is partially submerged in oil sump so that its parts are cooled by contact with oil.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. In a hydrostatic-mechanical torque division transmission with infinitely variable transmission ratio for a motor vehicle, the transmission including an engine driven hydrostatic unit and a compound and variable speed gearbox unit, the gearbox unit being drivingly coupled to the engine and to the hydrostatic unit, the gearbox unit comprising a planetary drive arranged on a centerline of an engine output shaft, the hydrostatic unit being positioned below the engine output shaft and adjacent to the planetary drive, characterized by:

a planetary drive output shaft drivingly coupled to a transmission output shaft through a gear train, the transmission output shaft being radially offset from the engine output shaft, the hydrostatic unit being positioned below the planetary drive, and the engine output shaft extending completely through the planetary drive and driving the hydrostatic unit via meshing gears and driving the planetary drive via the meshing gears and the hydrostatic unit.

2. The transmission of claim 1, wherein:

an intermediate gearbox is coupled between the planetary drive output shaft and the transmission output shaft, the intermediate gearbox making it possible to reverse the direction of rotation of the transmission output shaft and making it possible to shift between various transmission ratios.

3. The transmission of claim 1, wherein:

the engine output shaft comprises a central shaft which extends axially through the planetary drive, the central shaft having an end remote from the engine, said end driving the hydrostatic unit via a gear train and said end being coupled to an auxiliary drive; and the planetary drive output shaft comprises a hollow shaft.

4. The transmission of claim 1, wherein:

the hydrostatic unit has an output shaft which is coupled to a planetary drive input shaft via a gear train.

5. The transmission of claim 1, wherein:

the hydrostatic unit has an input shaft and an output shaft which are coaxial with each other, which extend from one side of the hydrostatic unit, and which are coupled via respective gear trains with the output shaft of the vehicle engine and with an input shaft of the planetary drive.

6. The transmission of claim 1, wherein:

the transmission output shaft is coupled through a gear train to a front axle drive shaft.

* * * * *